United States Patent [19]

Murphy

[11] Patent Number: 4,667,182
[45] Date of Patent: May 19, 1987

[54] STYLUS OR PEN WITH TACTILE RESPONSE TO USER

[75] Inventor: Alan S. Murphy, Eastleigh, England

[73] Assignee: International Business Machines Corp., Armonk, N.Y.

[21] Appl. No.: 564,252

[22] Filed: Dec. 22, 1983

[30] Foreign Application Priority Data

Jan. 28, 1983 [EP] European Pat. Off. ........ 83300475.7

[51] Int. Cl.⁴ .................... G08B 21/00; G09G 3/02
[52] U.S. Cl. .................... 340/407; 340/708; 178/18
[58] Field of Search ............ 340/407, 365 R, 365 L, 340/708–710; 178/18–20; 335/306, 207

[56] References Cited

U.S. PATENT DOCUMENTS

| 4,034,155 | 7/1977 | Muller et al. | 178/19 |
| 4,104,603 | 8/1978 | Wheeler et al. | 335/207 |
| 4,268,730 | 5/1981 | Higgins et al. | 178/18 |

FOREIGN PATENT DOCUMENTS

0152033 9/1982 Japan .................... 340/707

OTHER PUBLICATIONS

"Key with Electrical Tactile Feedback" by Berstis, vol. 24, No. 10, Mar. 1982 IBM Tech. Disclosure Bulletin.

Primary Examiner—John W. Caldwell, Sr.
Assistant Examiner—Tyrone Queen
Attorney, Agent, or Firm—John B. Frisone

[57] ABSTRACT

A stylus for interactive use with a graphics input tablet provides a user with a tactile response whenever the stylus tip (5) passes through the in-presence boundary of the tablet. The boundary defines the limit of the distance of the stylus above the tablet surface beyond which stylus position signals are regarded as unreliable. The tactile response is produced by a movable mass (2) within the body (1) of the stylus which is propelled by an internal mechanism (9, 10) into a lower end stop (11) as the tip passes through the in-presence boundary towards the tablet, and into an upper end stop (3) as the stylus passes through the boundary away from the tablet. The tactile response experience by a user in each case is different. In an alternative arrangement, the stylus tip (5) is attached to the moving mass (2) and arranged normally to be held retracted within the stylus body (1) but to automatically protrude from the body as the end of the stylus passes through the in-presence boundary.

8 Claims, 5 Drawing Figures

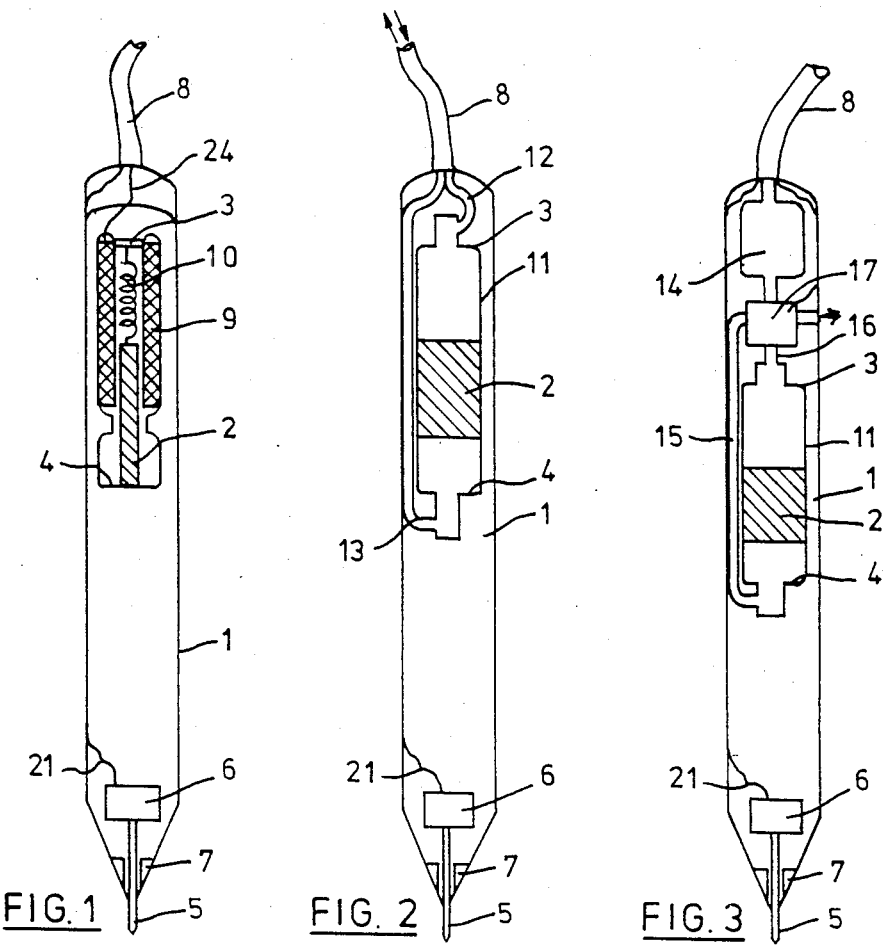
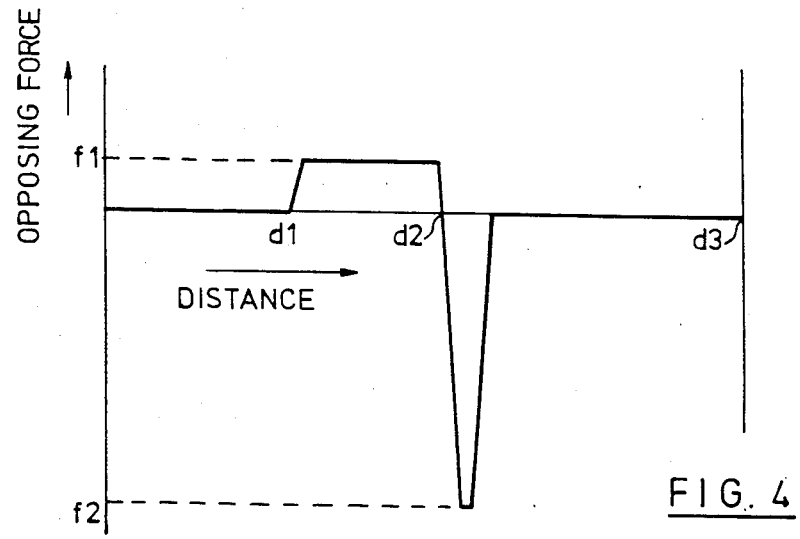

SECTION A-A

STYLUS OR PEN WITH TACTILE RESPONSE TO USER

FIELD OF THE INVENTION

This invention relates to a stylus or pen for interactive use with a graphics input tablet, and in particular to such a stylus which incorporates a mechanism operable to provide a user of the stylus with a tactile response as the stylus tip passes through an "in-presence" boundary of the tablet with which the stylus is used.

BACKGROUND OF THE INVENTION

The stylus and tablet are well known devices by means of which a user can interact with data displayed on a display screen. Several stylus and tablet combinations are described, for example, in a textbook 'Principles of Interactive Computer Graphics' by Newman and Sproull, 2nd Edition, Section 11-3, 'Tablets'. A stylus and tablet may be used in any of several ways to input data to a graphics display system to which it is attached. However, whether the stylus is being used to point to locations on the tablet, for example, to select items from a 'menu' of items overlaying the tablet surface, or to digitize by tracing or drawing, curves or diagrams for display on the screen, or to control the position of a graphics cursor on the screen, the information supplied to the system is always the same, and is in the form of signals representing the coordinate values of the position of the stylus tip with respect to the tablet surface.

A stylus typically incorporates a pressure-sensitive switch which closes when the user pushes the stylus against the tablet, or alternatively a button on the side of the stylus which can be operated at any time by the user, either of which are used to indicate to the application program being run on the graphics system that the stylus is at a position of interest.

The sensing mechanism for generating the stylus position signals varies from tablet to tablet, as will be apparent by reference to the aforementioned text book, but is most commonly electrical in nature. Upon receipt of the position signals identified by the user as of interest, the graphics system usually responds by displaying a cursor on the screen at a position corresponding to that of the stylus on the tablet, thus providing visual feedback to the user. In practice, the sensing mechanism for generating the coordinate signals is capable of detecting the presence of a stylus while it is still some distance above the tablet surface beyond which the tablet is incapable of reliably measuring the X and Y coordinates of the tip. However, once inside this notional boundary, the position signals derived by the tablet and stylus sensing mechanism have risen above noise level thresholds and can be reliably used by the system. The position of the boundary depends upon the sensitivity of the sensing mechanism and the signal level thresholds set by the logic sensing circuits within the graphics system itself, but typically lies between 5 mm and 10 mm above the tablet surface. Since a stylus tip inside the boundary is detectable by the system and its position over the surface of the tablet can be tracked, whereas a stylus outside the boundary is undetectable by the system, the boundary is referred to as the 'in-presence' boundary of the tablet.

In some applications and workstation configurations, it is desirable to give the user an indication of whether the stylus is 'in-presence' within the 'in-presence' boundary or 'out of presence' beyond the 'in-presence' boundary and thus whether or not the workstation is tracking the stylus tip. Digitizing applications often make use of the 'in-presence' or out-of-presence condition to distinguish between 'draw' and 'move' instructions and, as the user may be making as many as twenty or thirty pointings per minute, it is highly desirable to give an indication of which operation the workstation is performing.

In general, a positive indication that a stylus has passed through the 'in-presence' boundary and that the workstation is responding to his stylus positioning movements would be extremely useful to the user. The conventional way of indicating the 'in-presence' condition is by illuminating a light emitting diode on a control box or to give visual feedback on a display screen. This is, however, not very useful especially under circumstances where the user is concentrating his attention on the position of the stylus tip. An alternative to visual feedback is to use auditory feedback but this has the disadvantage that it can prove to be very distracting for applications requiring multiple pointings per minute or when there are multiple workstations in close proximity to each other. It is also usual to reserve auditory feedback for the workstation response to a tip switch closure or a successful correlate operation.

Tactile feedback is another alternative which has been used very successfully for keyboards and it is this technique which has been applied in the present invention to provide a response to the user indicating the instant in time when a stylus tip crosses the invisible 'in-presence' boundary of the tablet.

SUMMARY OF THE INVENTION

A stylus for interactive use with a graphics input tablet, according to the invention, comprises an elongated body portion, a stylus tip for pointing to locations on the tablet during said interactive use, and sensing means to indicate when said stylus tip passes through an 'in-presence' boundary of said tablet beyond which the distance is too great for reliable interaction between the stylus and tablet to occur, characterized in that said elongated body portion contains a movable mass supported for sliding motion between two longitudinally spaced end stops and driving means operable in response to movement of said stylus tip towards the tablet through the 'in-presence' boundary to cause the mass to be driven into the end stop nearest the stylus tip and operable in response to movement of the stylus tip through the 'in-presence' boundary away from the tablet to cause the mass to be driven into the end stop furthest from the stylus tip.

PRIOR ART

As the result of an investigation for prior art during the preliminary assessment of this invention, U. S. Pat. No. 4,104,603 was discovered which described a light pen for use on a CRT screen which provides the user with a tactile response. In this case, a permanent magnet mounted within the body of the pen attracts, and is normally in contact with, a small magnetic element. In use, the pen tip is brought into contact with the CRT screen and is depressed against spring pressure into the body of the pen. After movement over a predetermined distance, further movement of the pen tip results in the element being contacted and the force of resistance increases in consequence. Eventually, the element becomes disengaged from the magnet with a jolt producing the tactile response for the user.

In order that this mechanism shall operate, it must come into contact with a solid surface. In contrast, the mechanism of the present invention is activated when the stylus tip passes through an invisible boundary some distance above the tablet surface. Further, the mechanism for providing the tactile response is not operated in response to movement of a stylus switch for example, but is activated from a separate source in response to signals indicating that the 'in-presence' boundary has been crossed.

BRIEF DESCRIPTION OF THE DRAWINGS

In order that the invention may be fully understood, preferred embodiments thereof will now be described with reference to the accompanying drawings. In the drawings:

FIGS. 1, 2 and 3 show schematic representations of stylus constructions in which the moving mass producing the tactile response, in accordance with the present invention, is provided respectfully as a magnetically driven armature; a fluid driven piston; and an electrically controlled fluid driven piston;

FIG. 4 shows the force graph generated by the mechanism producing the tactile response as a stylus moves towards a tablet, through its 'in-presence' boundary, and into contact with the tablet surface.

SPECIFICATION

Figure 5:
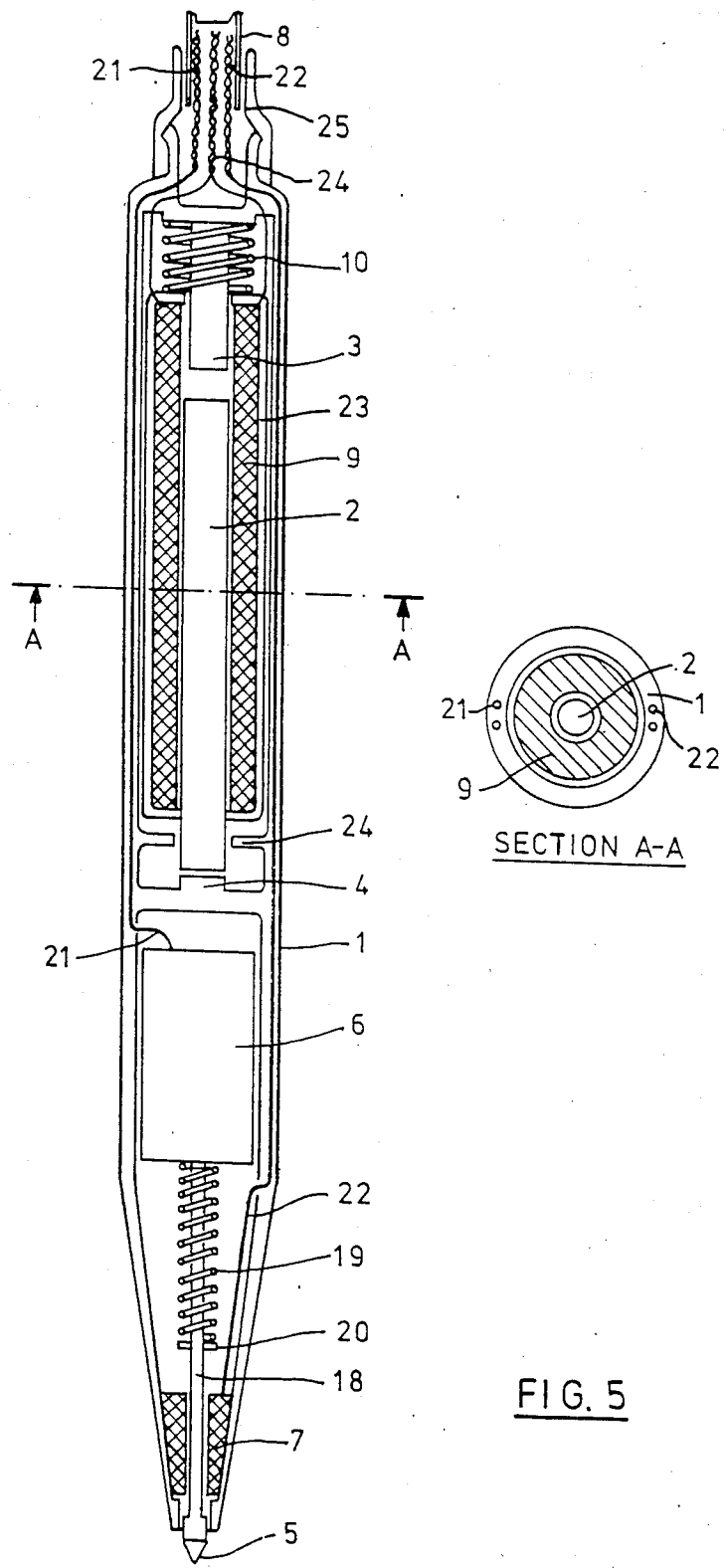
FIG. 5 shows in detail the construction of a stylus having a magnetically driven armature in which both coil and armature core move together to provide the tactile response.

FIGS. 1, 2 and 3 show schematically a stylus comprising an elongated body portion 1 containing an inertial mass 2 which can move in one direction or the other axially between end stops 3 and 4 along the body of the stylus. Each stylus is provided at its lower end with a spring loaded retractable stylus tip 5 which, when depressed into the body of the stylus against the spring pressure, activates a tip switch mechanism 6. It is by this means that a user signals the usual input action to the workstation such as for example:

(1) note the (x, y) coordinate values of this point;
(2) this is the required menu option selected for the next operation; and
(3) note the current position of the screen cursor.

Each stylus includes a device 7 which co-acts with the tablet to provide the 'in-presence' signals for the workstation. The nature of the device 7 depends on the technology employed and may be either a sensor for sensing signals transmitted by the tablet or alternatively a driver for transmitting signals to be detected by the tablet. Such devices and their operation are well known and further description is unnecessary for an understanding of the present invention.

Each stylus is provided with a drive mechanism within its body for propelling the inertial mass axially in either direction. A flexible connector 8 connects each stylus to its tablet controller and over which control and sense signals are communicated to and from the stylus.

Before describing the mechanisms (which differ in the three examples shown in FIGS. 1, 2 and 3) for driving the inertial mass 1 between the end stops of the stylus, the general principle of operation will be explained with reference to the force graph in FIG. 4.

Whenever the tablet hardware is unable to detect the stylus 'in-presence', the drive mechanism holds the inertial mass 2 in the 'up' position; that is, against upper end-stop 3 within the body furthest from the stylus tip. As soon as the tablet detects the stylus coming into presence, that is, passing through the notional 'in-presence' boundary represented by point d1 on the graph, the drive mechanism causes the mass 2 to be accelerated downward to impact the end stop 4 nearest to the stylus tip. The initial accelerating downward movement of the mass along the body imports a small upward force f1 to the stylus itself, which to the user feels like a momentary resistance to stylus movement towards the tablet. The impact of the mass with the lower end-stop represented by point d2 on the graph imparts a sharp downward force f2 on the stylus which causes the stylus to jerk towards the tablet. The overall effect to the user of the first slight resistance followed by a sharp downward jerk as the stylus tip moves through the 'in-presence' boundary is that of piercing a thin surface film. During continued movement of the stylus into contact with the tablet surface, represented by point d3 on the graph, the inertial mass 2 is held stationary within the body in contact with the lower end stop 4.

On lifting the stylus out of presence, the reverse effect is experienced. The drive mechanism is energized and the mass 2 is accelerated upward imparting a small downward force to the stylus. On impact with the upper end stop 3, the mass imparts an upward movement to the stylus. The effect is like pulling the stylus out of a bowl of fluid where the surface tension tends to hold the stylus in the fluid until the surface film is broken and thereafter the stylus rises quickly.

In FIG. 1, the mass 2 is provided as an armature which is driven by a small magnetically enclosed solenoid 9 by signals over conductor 24 supplied through the cable 8 connecting the stylus to the tablet controller. The armature mass 2 is supported by a compression return spring 10 which under normal circumstances keeps the armature at its lowest position against the lower end stop 4. The solenoid is energized, thus holding the armature 2 against the upper stop 3, whenever the stylus tip is out of presence and de-energized as soon as the 'in-presence' condition is detected whereupon gravity and spring pressure drive the armature into contact with the lower stop 4. On removal of the tip from the tablet through the 'in-presence' boundary, the solenoid is once more energized and the mass driven upward into the upper end stop 3.

In FIG. 2 the inertial mass 2 is provided as a piston in a cylinder 11. Two flexible fluid pipes 12 and 13 communicate with the upper and lower ends of the cylinder respectively and are connected via the flexible connector 8 to suitable control mechanisms in the tablet controller. As in the electro-mechanical embodiment described with reference to FIG. 1, the fluid pressure within the cylinder is such that the piston is held against the upper stop 3 whenever the stylus is outside the 'in-presence' condition. When the 'in-presence' condition is sensed, fluid pressure flows through pipes 12 and 13 in the direction of the arrows in FIG. 2 drives the piston into the lower stop 4. The direction of fluid flow is reversed as the stylus is withdrawn to drive the piston into contact with the upper end stop 3.

In FIG. 3 the inertial mass 2 is again provided as a piston in a cylinder 11. However in this example, a constant supply of air pressure is provided to an air reservoir 14 via flexible connector 8 and directed to either the lower end of the cylinder through air line 15 or to the upper end through air line 16 under control of an electrically operated fluidic switch 17. Excess air is ejected through a vent pipe as illustrated by the arrow in the figure.

The embodiments of the invention described so far have been shown in the drawings as schematic representations. FIG. 5 shows a detailed drawing of a preferred stylus construction employing a magnetically driven armature similar to that described with reference to FIG. 1. Where possible, the same reference numerals are used to indicate corresponding component parts in this figure as are used in FIG. 1.

The stylus body 1 of molded plastic material is provided with a retractable stylus tip 5 supported on a moving tip support 18 slidable mounted in a tip switch mechanism 6. The stylus tip is normally held protruding from the stylus end by means of a tip switch return spring 19 carried by the tip support 18 and bearing between the tip switch mechanism 6 and an annular shoulder 20 on the support 18. Connecting wires 21 to the tip switch mechanism are molded into the body of the stylus and connected to the tablet controller via the flexible connector 8.

A stylus sensor or driver coil 7 is provided as near to the stylus tip as practical and co-acts with the tablet sensing mechanism to provide 'in-presence' detection. Sensor/driver connection wires 22 communicate with the tablet controller via the flexible connector 8 and these, too, are molded into the plastic body 1 of the stylus.

The moving mass within the stylus body is provided as in the example described with reference to FIG. 1 by a movable armature 2 driven by a solenoid coil 9 between end stops 3 and 4. In this embodiment, however, the coil is attached to, and moves with the armature core which protrudes from the lower end of the coil. The coil extends beyond the core at the other end and is enclosed in a cover 23 provided as a layer of magnetically permeable material. The upper end stop 3 is also formed of magnetically permeable material and extends into the open end of the solenoid coil 9. Since a return path for magnetic flux is provided through the outer cover 23, a magnetic gap is defined between the end stop 3 and the adjacent end of the core 2 inside the coil 9. A lower solenoid guide 24 provides lateral restraint for the armature and coil during movement. A rubber protector 25 protects the otherwise exposed ends of the flexible connector 8. In the unenergized state, the armature and coil are held by the force from solenoid return spring 10 against the lower end stop 4 so that a magnetic gap exists between the upper end of the armature and the end stop 3 as explained above. A solenoid drive wire 24 is connected to the tablet controller via the connector 8 by means of which the solenoid is energized in response to detection of the 'in-presence' condition. The operation of this stylus is exactly as for the apparatus previously described with reference to FIG. 1 and will not be repeated.

While the basic invention has now been fully described, there are a number of variations which can advantageously be implemented. Thus, for example, by providing appropriate control logic, pen bounce or 'chatter' caused by small or slow movements of the stylus in or out of the 'in-presence' boundary can be prevented. The logic is easily implemented by incorporating a time delay to inhibit further energization of the mass driving mechanism during the time when the mass is already in motion within the body. Since time of travel of the mass within the body of the stylus is fairly constant, it is a simple matter to provide a suitable time delay. For example, for the electro-magnetically operated device, a simple single-shot can be used to provide an appropriate time out delay. The tablet may not require this bounce inhibit as there will be some positional hysteresis caused by the movement of the stylus in response to impact by the moving mass. The effect of this is to tend to hold the stylus 'in-presence' if it is already 'in-presence' and to keep it out-of-presence if it is already out-of-presence.

By connecting the stylus tip and its tip switch to the end of the moving armature, for example, the stylus tip can be made to appear from the end of the stylus as it passes through the 'in-presence' boundary towards the tablet and retract again within the body of the stylus as it moves through the boundary away from the tablet. With this variation, it is advisable to limit the armature movement to 2 or 3 mms. The advantage of this variation is that the user will both see and feel the tip movement.

Although a number of mechanisms for driving the moving mass have been described, it will be apparent that other alternatives exist. For example, the mechanical spring 10 is replaced by a permanent magnet or an electromagnet and the solenoid is energized positively to drive its core in one direction or negatively to drive it in the other.

I claim:

1. A stylus for interactive use with a graphics input tablet, comprising an elongated body portion (2), a stylus tip (5), for pointing to locations on the tablet during said interactive use, and sensing means (7) to indicate when said stylus tip passes through an in-presence boundary of said tablet beyond which the distance between the stylus tip and the graphics input tablet is too great for reliable interaction between the stylus and tablet to occur, said elongated body portion containing a movable mass (2) supported for sliding motion between two longitudinally spaced first and second end stops (3 and 4), said first end stop being closer to said stylus tip than said second end stop, and driving means (9, 10; 11, 12, 13; 11, 14, 15, 16 and 17) operable in response to movement of said stylus tip in a direction towards the tablet through the in-presence boundary to cause the mass to be driven into the first end stop (4) nearest the stylus tip and operable in response to movement of the stylus tip through the in-presence boundary in a direction away from the tablet to cause the mass to be driven into the second end stop (3) furthest from the stylus tip.

2. A stylus as in claim 1, in which said movable mass comprises an armature of a solenoid and said driving means comprises in combination, a winding (9) of said solenoid which when energized produces a force on said armature sufficient to drive it in one direction to impact and hold in contact with said second end stop, and a spring (10) arranged to exert a force on said armature in a direction away from said second end stop sufficient, in the absence of energization of said winding, to drive the armature in a direction to impact and hold in contact with the said first end stop.

3. A stylus as in claim 2, in which said winding is of elongate form supported within said elongated body portion and attached to, for movement with, said armature itself provided as an elongate axial core within, but protruding from one end of, said winding, the other end of said winding extending beyond said core and surrounding at least a portion of said second end stop (3) itself provided as an elongate rod of magnetic material, the winding being provided with an external layer (23) of magnetic material so as to provide, in use, a return path for magnetic flux generated in the core upon energization of said winding, thereby defining a magnetic gap between the second end stop of magnetic material and the end of the core within the winding adjacent thereto.

4. A stylus as in claim 1, in which said movable mass comprises a piston within a cylinder (11) and said driving means includes a first pipe line (12; 15) connected to supply fluid under pressure to one end of the cylinder thereby driving the piston in one direction to impact and hold said piston in contact with said first end stop (4), and a second pipe line (13; 16) connected to supply fluid under pressure to another end of the cylinder thereby driving the piston in an opposite direction to impact and hold in contact with the second end (3) stop.

5. A stylus as in claim 4, in which said drive means further includes a reservoir (14) for holding fluid under pressure and an electrically operated switch (17) for directing fluid from said reservoir either to said first pipe line (15) or to said second pipe line (16).

6. A stylus as in any one of the preceding claims, in which said stylus tip is attached to, for movement with, said movable mass, the construction and arrangement being such that the stylus tip is held retracted within the body of the stylus when outside the in-presence boundary and protrudes from the body of the stylus when inside the in-presence boundary.

7. In a combination of a tablet and stylus as in any one of claims 1-5, control means operable in response to in-presence detection of the stylus above the tablet surface to energize said driving means and including time delay means operable to inhibit further operation of said driving means during motion of said mass within the body of the stylus.

8. In a combination of a tablet and stylus as in claim 6, control means operable in response to in-presence detection of the stylus above the tablet surface to energize said driving means as aforesaid and including time delay means operable to inhibit further operation of said driving means during motion of said mass within the body of the stylus.

* * * * *